(12) United States Patent
Luo et al.

(10) Patent No.: US 9,679,036 B2
(45) Date of Patent: Jun. 13, 2017

(54) PATTERN MINING BASED ON OCCUPANCY

(75) Inventors: Ping Luo, Beijing (CN); Min Wang, Beijing (CN); Linpeng Tang, Shanghai (CN); Lei Zhang, Anhui (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 187 days.

(21) Appl. No.: 14/398,213

(22) PCT Filed: May 15, 2012

(86) PCT No.: PCT/CN2012/075497
§ 371 (c)(1),
(2), (4) Date: Oct. 31, 2014

(87) PCT Pub. No.: WO2013/170435
PCT Pub. Date: Nov. 21, 2013

(65) Prior Publication Data
US 2015/0127602 A1   May 7, 2015

(51) Int. Cl.
*G06F 17/30* (2006.01)
*G06N 5/02* (2006.01)

(52) U.S. Cl.
CPC .. *G06F 17/30572* (2013.01); *G06F 17/30592* (2013.01); *G06N 5/025* (2013.01); *G06F 2216/03* (2013.01)

(58) Field of Classification Search
USPC ........................................ 707/722, 727, 607
See application file for complete search history.

(56) References Cited

U.S. PATENT DOCUMENTS

| 6,173,280 B1* | 1/2001 | Ramkumar ....... G06F 17/30539 |
| 6,665,669 B2 | 12/2003 | Han et al. |
| 7,379,937 B2 | 5/2008 | Inokuchi |
| 2008/0126347 A1 | 5/2008 | Mori |
| 2008/0126437 A1 | 5/2008 | Chiba |
| 2009/0327342 A1 | 12/2009 | Xiao et al. |
| 2012/0011040 A1 | 1/2012 | Beydler et al. |
| 2012/0066065 A1* | 3/2012 | Switzer ............. G06Q 30/0255 705/14.53 |

FOREIGN PATENT DOCUMENTS

| CN | 102214248 A | 10/2011 |
| CN | 102306183 | 1/2012 |

OTHER PUBLICATIONS

International Preliminary Report on Patentability received in PCT Application No. PCT/CN2012/075497, Jan. 31, 2013, 5 pages.
International Searching Authority, PCT/CN2012/075497, Filed May 15, 2012, International Search Report and Written Opinion, mailed Jan. 31, 2013; 9 pages.
Ahmed, F.C. et al.; "HUC-prune: an Efficient Candidate Pruning Technique to Mine High Utility Patterns"; Jul. 14, 2009; 18 pages.
(Continued)

*Primary Examiner* — Hung T Vy

(57) ABSTRACT

An example method of pattern mining includes identifying, via a logic circuit, a plurality of patterns present in a plurality of transactions, the transactions including sets of items, and selecting, via the logic circuit, one of the identified patterns based on an occupancy of the identified pattern in the transactions.

18 Claims, 11 Drawing Sheets

(56) References Cited

OTHER PUBLICATIONS

International Searching Authority, PCT/CN20121075497, Filed May 15, 2012, International Search Report and Written Opinion, mailed Jan. 31, 2013; 9 pages.

Wang, Jianyong, et al.; TFP: An Efficient Algorithm for Mining Top-k Frequent Closed Itemsets; Knowledge and Data Engineering; IEEE Transactions on vol. 17, Issue 5, May 2005, pp. 652-663.

Xie, Y. et al.; "Max-clique: a Top-down Graph-based Approach to Frequent Pattern Mining"; 2010; pp. 11-39-1144.

CN First Office Action dated Dec. 12, 2016, CN Patent Application No. 201280072816.4 dated May 15, 2012, State Intellectual Property Office of the P.R. China, 7 pages.

Extended European Search Report dated Jan. 25, 2017 for EP Application No. 12876868.6; pp. 10.

F. Geerts et al: "Tiling databases", Lecture Notes in Computer Science, vol. 3245, Oct. 2, 2004 (Oct. 2, 2004), pp. 278-289, XP055334787, DOI: 10.1007/978-3-540-30214-8_22 *sections 1-3*.

J. Wang et al: "TFP: an efficient algorithm for mining top-k frequent closed itemsets", IEEE Transactions on Knowledge and Data Engineering vol. 17, No. 5, Mar. 17, 2005 (Mar. 17, 2005), pp. 652-664, XP011128763, DOI: 10.1109/TKDE.2005.81 *Sections 1-3*.

K. Gade et al: "Efficient closed pattern mining in the presence of tough block constraints", Proceedings of the 10th ACM SIGKDD International Conference on Knowledge Discovery and Data Mining (KDD'04), Aug. 22, 2004 (Aug. 22, 2004), pp. 138-147, XP058234416, DOI: 10.1145/1014052.1014070 *see sections 1-3*.

M. Steinbach et al: "Generalizing the notion of support", Proceedings of the 10th ACM SIGKDD International Conference on Knowledge Discover and Data Mining (KDD'04), Aug. 22, 2008 (Aug. 22, 2004), pp. 689-694, XP058234485, DOI: 10.1145/1014052.1014141 *the whole document*.

W. A. Aljandal et al: "Validation-based normalization and selection of interestingness for association rules", Proceedings of the 18th ANNIE Conference, Nov. 9, 2008 (Nov. 9, 2008), XP055334784, Retrieved from the InternetL URL: http://people.cs.ksu.edu/-dcaragea/papers/aljandal-annie-2008.pdf [retrieved on Jun. 1, 2009] *the whole document*.

\* cited by examiner

PATTERN MINING BASED ON OCCUPANCY

BACKGROUND

Data mining involves searching databases for data points or data sets to solve a particular problem. Frequent pattern mining involves data mining with the objective of identifying patterns that frequently occur in a data set. The most common metric for identifying patterns is frequency, which is the number of times a pattern appears in a transaction database. In such contexts, frequency is used as the primary measure for pattern interestingness.

DETAILED DESCRIPTION

Figure 1:
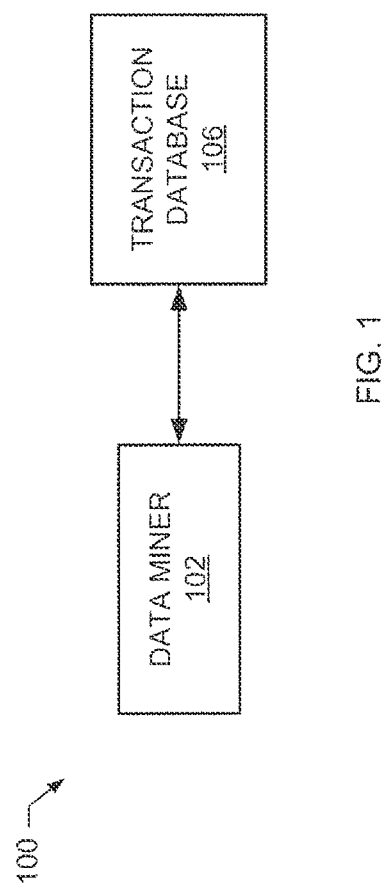
FIG. 1 is a block diagram of an example system to perform pattern mining.

Example methods, apparatus, and articles of manufacture disclosed herein use a measure referred to herein as occupancy. Occupancy is defined as the degree that a pattern (or itemset) occupies (e.g., predominates) the items in its supporting transactions. In some examples, a pattern mining application prefers patterns that occupy larger portions of the transactions in which they appear. Example methods, apparatus, and articles of manufacture use occupancy to provide improved pattern mining for certain types of applications. The terms "pattern" and "itemset" are used interchangeably throughout this disclosure.

A first example application in which using occupancy may be advantageous is on print-area recommendation for Web pages. Printouts generated by a web browser's print function may be unsatisfactory, because the printout contains a large portion of irrelevant content (e.g., navigation menu, advertisements, related links, etc.). To solve this problem, Hewlett-Packard provides the HP Smart Print service, which contains a user-friendly interface so that a user can easily select her interested print areas. Such selections may be stored in print logs (e.g., with user consent). An interesting challenge is to automatically and accurately recommend interesting print areas to a user based on print logs generated by other users, so that the user receives the interesting print areas without performing the manual selections. If each content clip (e.g., a content area selected by another user) is an item, and all the selected clips by a user on a given Web page are considered a transaction of items, the print log data from all users form a transaction database. As a result, an itemset (e.g., a set of content clips) in a given Web page may be recommended to users based on this transaction database. The recommended itemset may occur frequently to reflect the interests of most users. However, the completeness of the itemset is also important. The set of recommended content clips should occupy a large portion of the transactions (e.g., user-selected sets of clips) it appears in, so that the recommendation is complete (e.g., so the user does not feel that the recommendation is missing relevant content).

In a second example application, an investment portfolio recommendation application may advantageously use occupancy to identify patterns in investment strategies. For a transaction database that contains a large set of high-quality and diversified investment portfolios, each transaction represents a set of financial assets (e.g. stocks, bonds, etc.) owned by an experienced investor. The goal of the example application is to mine (e.g., determine, identify) quality (e.g., interesting) patterns (e.g., high-quality and/or diversified patterns) from the database, which may be used to recommend an investment plan to new investors. The example application may advantageously prefer investment patterns that appear frequently in the database. However, because a good investment portfolio usually works as an entirety to achieve investment balance and reduce risks, the example application may also value investment patterns that cover a large portion of the transactions in which they appear. For example, given two patterns X and Y of equal frequency, if X covers 90% assets of its supporting transactions while Y only covers 30%, it is natural to consider X as a better investment pattern. Thus, the occupancy of a pattern is potentially very useful to a portfolio investment recommendation application.

In the two example applications discussed above, occupancy becomes another measure of pattern interestingness, which is an advantageous complement to "frequency" (also referred to herein as "support"). In some example methods, apparatus, and articles of manufacture disclosed herein, a pattern is considered interesting if it is not only frequent (e.g., its support value is higher than a threshold $\alpha$), but also has a high occupancy (e.g., has a high coverage, predominates) in its supporting transactions. A pattern is considered dominant if its occupancy is above a threshold $\beta$. A pattern is considered qualified if it is both frequent and dominant. Example methods, apparatus, and articles of manufacture disclosed herein mine qualified patterns with respect to a support threshold $\alpha$ and an occupancy threshold $\beta$.

Some example methods, apparatus, and articles of manufacture disclosed herein address the problem of mining the top-k qualified patterns (where k is a desired number of qualified patterns, such that k=5 would result in mining the top 5 qualified patterns). The term k may be defined by a user. In some such examples, the top-k qualified patterns are determined with respect to a weighted sum of support and occupancy. The weights for support and/or occupancy may also be defined by a user. In some examples, the value of occupancy does not increase or decrease monotonically when more items are added to a given itemset. Some example methods, apparatus, and articles of manufacture determine (e.g., calculate, estimate, etc.) upper bounds of occupancy and/or quality for identified patterns in a transaction itemset and use the upper bound(s) to prune a search process for qualified pattern mining. Some example methods, apparatus, and articles of manufacture consider harmonic occupancy. Some other examples consider arithmetic occupancy.

As used herein, a transaction database is a set of transactions. Each transaction is a set of items. I refers to the complete set of distinct items. T is the complete set of transactions. An itemset is a non-empty set of items. A transaction set is a set of transactions. The transactions that contain all the items in an itemset X are the supporting transactions of X, denoted as Tx. The frequency of an itemset X is denoted as freq(X), and is equal to the number of transactions in Tx.

The support of X is defined as σ(X)=freq(x)/|T|. For a given minimum support threshold α (0<α≤1), X is said to be frequent if σ(X)≥α.

For an itemset X we identify all its supporting transactions Tx. For each transaction t∈Tx we calculate the ratio of |X| (the number of items in the itemset X) divided by |t| (the number of items in the transaction t) (e.g., |X|/|t|). These ratios are aggregated for all of the supporting transactions Tx to compute a single value of occupancy for X. In some examples, the occupancy refers to the average of the ratios. Additionally or alternatively, other aggregate functions such as quantile or min may also be used. Formally, the occupancy of an itemset X is defined as $$\phi(X) = \text{average}\left(\left\{\frac{|X|}{|t|}: t \in Tx\right\}\right),$$

where average( ) is the average function of all the values in the set.

Either of two different example average functions, harmonic average and arithmetic average, may be used to determine the occupancy φ(X). Harmonic occupancy and arithmetic occupancy are illustrated below with reference to a transaction database defined in Table 1.

TABLE 1

Transaction Database

| Trans No. | Length | Items |
|---|---|---|
| t1 | 12 | 1 2 4 7 8 9 10 14 15 16 20 21 |
| t2 | 8 | 2 5 7 9 12 14 15 20 |
| t3 | 5 | 2 7 13 14 20 |
| t4 | 11 | 1 2 4 5 7 8 14 15 18 20 21 |
| t5 | 6 | 2 3 7 11 14 20 |
| t6 | 12 | 1 2 5 6 7 9 12 14 15 17 19 21 |
| t7 | 4 | 2 7 14 20 |
| t8 | 4 | 2 7 14 20 |
| t9 | 4 | 2 7 14 20 |
| t10 | 3 | 2 14 20 |

For a set A of some values, the harmonic average of the values in A is $$HAverage(A) = \frac{|A|}{\sum_{a \in A} \frac{1}{a}}.$$

For a set A of some values, the arithmetic average of the values in A is $$AAverage(A) = \frac{\sum_{a \in A} a}{|A|}.$$

The harmonic occupancy of an itemset X is defined as $$\phi_H(X) = HAverage\left(\left\{\frac{|X|}{|t|}: t \in Tx\right\}\right) = \frac{|Tx||X|}{\sum_{t \in Tx} |t|}.$$

The arithmetic occupancy of an itemset X is defined as $$\phi_A(X) = AAverage\left(\left\{\frac{|X|}{|t|}: t \in Tx\right\}\right) = \frac{1}{|Tx|}\sum_{t \in Tx} \frac{|X|}{|t|}.$$

In some examples, the occupancy of an itemset is an aggregation, for the transactions that support the pattern, of a ratio of a first number of items in the pattern to a second number of total items in the supporting transaction(s) of the pattern. Using an average function as the aggregation, the occupancy of an itemset X is the average ratio of the occurrences of the items in X to the number of the items in the transaction it appears in.

In other words, if the itemset X includes 5 items, and the average transaction in which X appears includes 5 items not included in X, the itemset X has an occupancy of 0.50. A high value of the occupancy indicates that besides the items in X there are only a small number of items left inside the supporting transactions of X.

Using the example transaction database in Table 1, the harmonic and arithmetic occupancy of two example itemsets, I1={2, 7, 14, 20} and I2={2, 7, 14, 15, 20}, may be calculated. The supporting transactions of I1 in Table 1 are {t1, t2, t3, t4, t5, t7, t8, t9} while the supporting transactions of I2 in Table 1 are {t1, t2, t4}.

The harmonic occupancy of I1 is $$\phi_H(I_1) = \frac{4 \times 7}{12+8+5+11+4+4+4} \approx 0.58.$$

The harmonic occupancy of I2 is $$\phi_H(I_2) = \frac{5 \times 3}{12+8+11} \approx 0.48.$$

The arithmetic occupancy of I1 is $$\phi_A(I_1) = \frac{\frac{4}{12}+\frac{4}{8}+\frac{4}{5}+\frac{4}{11}+\frac{4}{4}+\frac{4}{4}+\frac{4}{4}}{7} \approx 0.71.$$

The arithmetic occupancy of I2 is $$\phi_A(I_2) = \frac{\frac{5}{12} + \frac{5}{8} + \frac{5}{11}}{3} \approx 0.50.$$

While it may seem intuitive that an itemset containing more items leads to a larger value of occupancy, this is not always true. Even though $I1 \subseteq I2$ (i.e., I1 is a subset of, but is not equal to, I2), the harmonic and arithmetic occupancies of I1 are greater than the like occupancies of I2 (e.g., $\phi H(I1) > \phi H(I2)$ and $\phi A(I1) > \phi A(I2)$). The reason is that I2 only appears in larger transactions, where it only occupies a small fraction, while I1 appears in many smaller transactions where it occupies a large fraction. Thus, occupancy does not always increase monotonically when we add more items to an itemset. Similarly, we can show that occupancy does not always decrease monotonically when we add more items to an itemset either. Note that this observation holds for both harmonic and arithmetic occupancy. This non-monotonic property of occupancy is in contrast to that of support in frequent pattern mining.

For a given lower occupancy threshold $\beta$ ($0 < \beta \leq 1$), X is said to be dominant if $\phi(X) \geq \beta$.

The quality of an itemset can be measured by combining support and occupancy. The quality of an itemset X is defined as $q(X) = \sigma(X) + \lambda \phi(X)$, where $\lambda$ is the occupancy weight ($0 \leq \lambda < +\infty$). In some examples, the weight $\lambda$ is a user-defined parameter, and captures the relative importance of support and occupancy to a particular user application. For example, a user may select a lower weight $\lambda$ for the example Smart Print application than for the example investment portfolio recommendation application. While the weight $\lambda$ is illustrated as a factor applied to the occupancy $\phi(X)$, a weighting factor may additionally or alternatively be applied to the support. For a given minimum support threshold $\alpha$ and a minimum occupancy threshold $\beta$ ($0 < \alpha, \beta \leq 1$), X is said to be qualified if $\sigma(X) \geq \alpha$ and $\phi(X) \geq \beta$.

FIG. 1 is a block diagram of an example system 100 to provide quality itemsets. The example system 100 includes a data miner 102 and a transaction database 106.

The example data miner 102 of FIG. 1 identifies pattern(s) present in transactions (e.g., transactions in the transaction database 106) and selects an identified pattern based on an occupancy of the identified pattern in the transactions. In the example of FIG. 1, the data miner 102 selects (e.g., recommends to an application) patterns having at least a threshold occupancy and/or at least a threshold quality.

Figure 2:
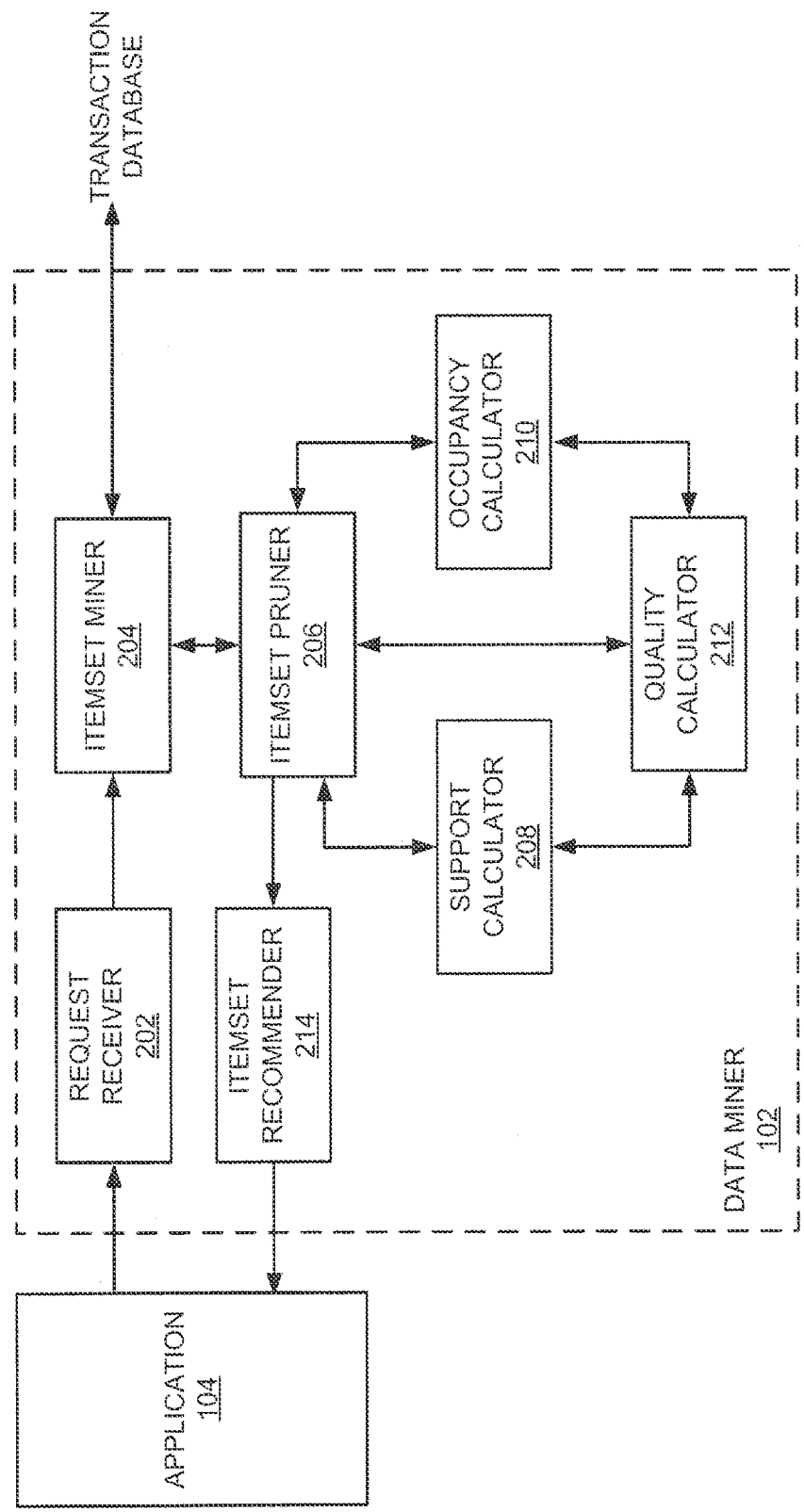
FIG. 2 is a more detailed block diagram of the example data miner of FIG. 1.

In some examples, the data miner 102 receives requests for quality itemsets (e.g., patterns) from a pattern recommendation application (see the example of FIG. 2). Based on the requests, the data miner 102 accesses the transaction database 106 to identify pattern(s). The example data miner 102 is described in more detail below with reference to FIG. 2.

The example transaction database 106 stores transactions. The transactions include sets of items. In some examples, the transaction database stores transactions based on user request(s). The transaction database 106 may be populated using a database application prior to performing data mining (e.g., pattern mining). In some other examples, the transaction database 106 is populated (e.g., by a database application, by a monitoring application, etc.) with one or more types of transactions including specified fields appropriate for the pattern recommendation application. Transactions in the transaction database 106 may include the same and/or different numbers and/or types of items. Furthermore, transactions in the transaction database may include one or more mandatory items.

FIG. 2 is a more detailed block diagram of the example data miner 102 of FIG. 1. The example data miner 102 of FIG. 2 may be used to recommend itemsets (e.g., patterns) to a pattern recommendation application (e.g., the application 104) based on transactions within a transaction database (e.g., the transaction database 106 of FIG. 1).

The example pattern recommendation application 104 of FIG. 2 receives user input (e.g. a definition of a quality itemset, a threshold support a, a threshold occupancy $\beta$, and/or a weight $\lambda$) and provides the user with quality itemsets. In some examples, the pattern recommendation application 104 requests interesting patterns to be both frequent and dominant. If a pattern X is frequent, there are enough cases in which the pattern X appears in the transaction database. Thus, it may advantageously improve the recommendation precision. If the pattern X is dominant, it indicates that the recommendation of X is complete enough. Thus, it may advantageously improve the recall of the recommendation.

The example data miner 102 of FIG. 2 includes a request receiver 202. The request receiver 202 of FIG. 2 receives a request from the pattern recommendation application 104 (e.g. for a recommended pattern). The request may include a definition of a quality itemset (e.g., a threshold quality), a threshold support a, a threshold occupancy $\beta$, and/or a weight $\lambda$. The example request may further include desired results, such as a number of highest-quality patterns, any qualified patterns, etc.

The example data miner 102 of FIG. 2 further includes an itemset miner 204. The example itemset miner 204 accesses the transaction database 106 to identify and/or retrieve relevant transactions based on the request (e.g., from the application 104 via the request receiver). Using the Smart Print example, the itemset miner 204 of FIG. 2 accesses transactions related to the web site the user desires to print (e.g., where the web site is specified via the request receiver 202). Based on the identified (e.g., retrieved) transactions, the example itemset miner 204 constructs a subset tree representative of the hierarchy of itemsets in the identified transactions. The subset tree represents a search space to be analyzed to find qualified and/or highest-quality patterns in the transaction database.

The example data miner 204 of FIG. 2 further includes an itemset pruner 206. The example itemset pruner 206 receives the transactions and/or the subset tree from the itemset miner 204. The itemset pruner 206 prunes the subset tree to reduce the search space to be analyzed. In this manner, the itemset pruner 206 increases an efficiency of pattern mining. In some examples, the itemset pruner 206 prunes the subset tree by determining (e.g., calculating, estimating) an upper bound on occupancy and/or an upper bound on quality for a subtree of the subset tree. For example, if a first node at a first (e.g., highest, second highest, etc.) level of the subset tree has an upper occupancy (or quality) bound that is lower than an upper occupancy (or quality) bound of another node on the subset tree, the first node and all subnodes of the first node may be pruned (e.g., removed, not searched, etc.). Example methods of determining (e.g., calculating, estimating) the upper bound of a node and/or a subtree of the subset tree are described below. A node in a subset tree represents a distinct itemset (e.g., pattern). A parent node represents an itemset that is a subset of its child node(s). An example subset tree is described below with reference to FIG. 3.

To prune the subset tree, the example itemset pruner 206 receives measurements (e.g., calculations, estimations) of support from a support calculator 208, measurements (e.g., calculations, estimations) of occupancy from an occupancy calculator 210, and/or measurements (e.g., calculations, estimations) of quality from a quality calculator 212. The example support calculator 208 of FIG. 2 receives transaction(s) and at least one of a pattern (e.g., a node in the subset tree) or a subtree (e.g., a set of patterns) from the itemset pruner 206.

The support calculator 208 determines (e.g., calculates, estimates) the support (e.g., frequency) of the pattern or subtree. In some examples, the support calculator 208 determines (e.g., calculates, estimates) an upper bound on the support for a subtree.

The example occupancy calculator 210 of FIG. 2 receives transaction(s) and at least one of a pattern (e.g., a node in the subset tree) or a subtree (e.g., a set of patterns) from the itemset pruner 206. The occupancy calculator 210 determines (e.g., calculates, estimates) the occupancy of the pattern or subtree. In some examples, the occupancy calculator 210 determines (e.g., calculates, estimates) an upper bound on the occupancy for a subtree of nodes.

The example quality calculator 212 of FIG. 2 receives a weight $\lambda$, transaction(s), and at least one of a pattern (e.g., a node in the subset tree) or a subtree (e.g., a set of patterns) from the itemset pruner 206. The quality calculator 212 determines (e.g., calculates, estimates) the quality of the pattern or subtree. In some examples, the quality calculator 212 determines (e.g., calculates, estimates) an upper bound on the quality for a subtree.

The example itemset pruner 206 uses the support (e.g., from the support calculator 208), the occupancy (e.g., from the occupancy calculator 210), and/or the quality (e.g., from the quality calculator 212) to prune the subset tree, and provides the pruned subset tree to an itemset recommender 214. The example itemset recommender searches (e.g. analyzes the remaining nodes (e.g., patterns)) to identify qualified patterns and/or the top-k quality patterns. The example itemset recommender 214 then provides the requested results to the pattern recommendation application 104.

Figure 3:
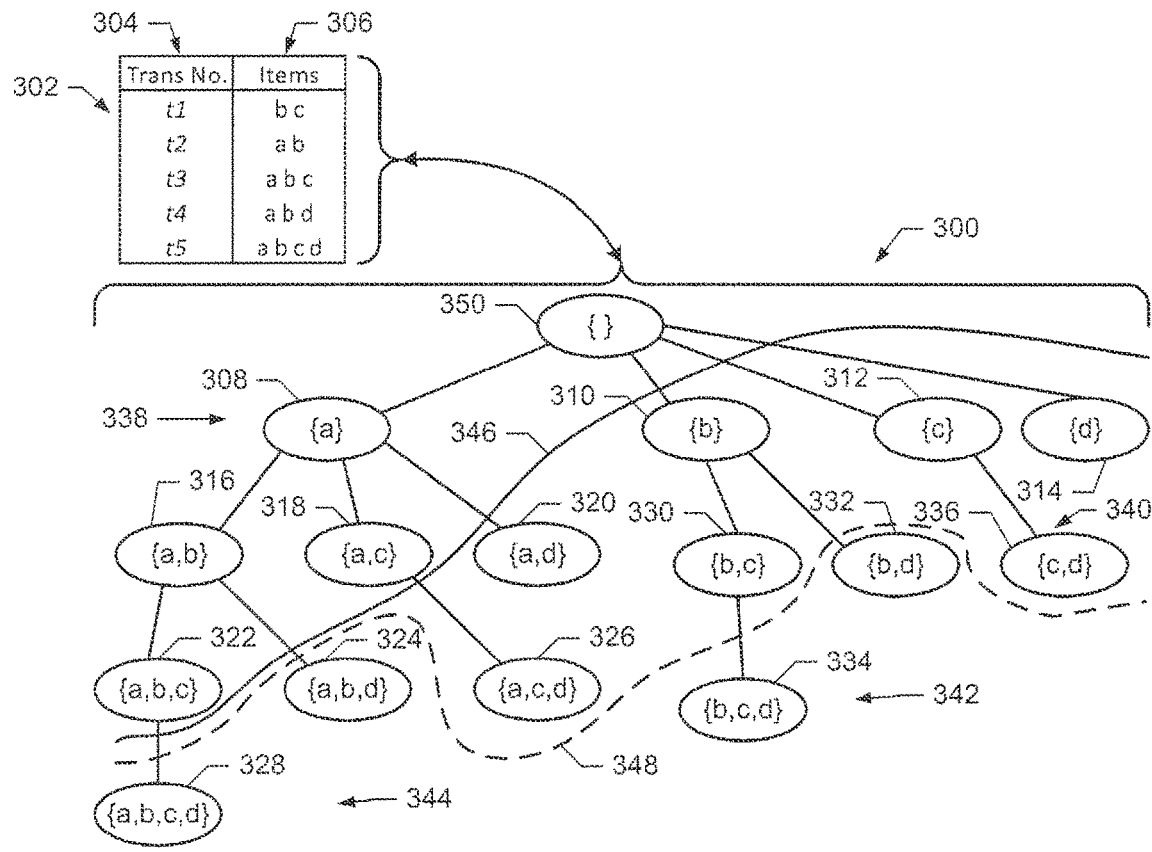
FIG. 3 illustrates a subset tree for an example transaction database.

FIG. 3 illustrates a subset tree 300 for an example transaction database 302. The example transaction database 302 of FIG. 3 includes five transactions 304 (e.g., t1, t2, t3, t4, t5). Each of the example transactions t1-t5 of FIG. 3 includes a set of items 306.

The example subset tree 300 includes a plurality of nodes 308-336 arranged in a hierarchy based on lexicographical subsets. However, the subset tree 300 may be based on other hierarchical organizations. The nodes 308-336 of FIG. 3 are determined based on the items (e.g., a, b, c, and d) present in the transactions 304 of the example transactions. Each of the example nodes 308-336 represents an itemset occurring and/or potentially occurring based on the items (e.g., a, b, c, and/or d) present in the example transaction database 302. The first level 338 of the subset tree 300 includes single-item nodes (e.g., itemsets) 308-314. Subsequent levels 340, 342, 344 include nodes (e.g., itemsets) having larger numbers of items. The example nodes 308-336 are arranged in the subset tree 300 such that an itemset only appears once on the tree 300, and parent nodes (e.g., higher-level nodes) are subsets of child nodes (e.g., lower-level nodes).

The example itemset pruner 206 of FIG. 2 may advantageously prune the subset tree 300 based on the support, occupancy, and/or quality of the example nodes. In some examples, the itemset pruner 206 uses an upper bound of occupancy and/or quality for higher-level nodes (e.g., any of the nodes 308-312, 316, 318, 32, and/or 330) to prune lower-level nodes (e.g., any of the nodes 316-328). For example, if node 318 (e.g., {a,c}) has been found to have the highest quality of 1.467 at a particular time during pruning, other nodes can be pruned by determining the quality bound of the node(s) and comparing it to the highest quality. In the illustrated example, the quality for node 318 is higher than an upper bound for the subtree rooted at node 310 {b}. Thus, the subtree {b} can be pruned (e.g., not searched).

To illustrate the advantages of the example methods, apparatus, and articles of manufacture disclosed herein, FIG. 3 illustrates the search space of the example data miner 102 of FIGS. 1 and 2 compared to the search space of pattern mining using only support. The nodes above the solid line 346 (e.g., nodes 308, 316, 318, and 322) represent the search space following pruning by the example data miner 102 (e.g., the itemset pruner 206) based on upper quality bounds, where $\alpha$=0.4, $\beta$=0.3, and $\lambda$=1. In contrast, the nodes above the dashed line 348 (e.g., nodes 308-322, 326, 330, and 340) represent the search space for pattern mining using only support. As shown in FIG. 3, the search space for the data miner 102 is significantly smaller and, thus, results in a more efficient search of the transaction database 106 to obtain recommended itemset(s).

The example subset tree 300 of FIG. 3 also includes a root node 350, which represents an empty itemset. The example root node 350 is considered a parent node of the example nodes 308-314 at the first level 330 of the example subset tree 300. In some examples described below, the root node 350 may be processed to accomplish recursion of example methods and/or instructions.

While an example manner of implementing the data miner 102 of FIG. 1 has been illustrated in FIG. 2, one or more of the elements, processes and/or devices Illustrated in FIG. 2 may be combined, divided, re-arranged, omitted, eliminated, and/or implemented in any other appropriate manner. Further, the example request receiver 202, the example itemset miner 204, the example itemset pruner 206, the example support calculator 208, the example occupancy calculator 210, the example quality calculator 212, the example itemset recommender 214 and/or, more generally, the example data miner 102 of FIGS. 1 and 2 may be implemented by hardware, software, firmware, and/or any appropriate combination of hardware, software, and/or firmware. Thus, for example, any of the example request receiver 202, the example itemset miner 204, the example itemset pruner 206, the example support calculator 208, the example occupancy calculator 210, the example quality calculator 212, the example itemset recommender 214 and/or, more generally, the example data miner 102 of FIGS. 1 and 2 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this disclosure are read to cover a purely software and/or firmware implementation, at least one of the example request receiver 202, the example itemset miner 204, the example itemset pruner 206, the example support calculator 208, the example occupancy calculator 210, the example quality calculator 212, and/or the example itemset recommender 214 are hereby expressly defined to include a tangible computer readable medium such as a memory, DVD, CD, Blu-ray, etc. storing the software and/or firmware. Further still, the example data miner 102 of FIGS. 1 and 2 may include one or more elements, processes, and/or devices in addition to, or instead of, those illustrated in FIG. 2, and/or may include more than one of any or all of the illustrated elements, processes, and devices.

Flowcharts representative of example machine readable instructions for implementing any of the data miner 102 of FIGS. 1 and 2 are shown in FIGS. 4-9B. In this example, the machine readable instructions comprise a program for execution by a processor such as the processor 1012 shown in the example processor platform 1000 discussed below in connection with FIG. 10. The program may be embodied in software stored on a tangible computer readable medium such as a computer readable storage medium (e.g., a CD-ROM, a floppy disk, a hard drive, a digital versatile disk (DVD), a Blu-ray disk, or a memory associated with the processor 1012), but the entire program and/or parts thereof could alternatively be executed by a device other than the processor 1012 and/or embodied in firmware or dedicated hardware. Further, although the example program is described with reference to the flowchart illustrated in FIGS. 4-9B, other appropriate methods of implementing the example data miner 102 may alternatively be used. For example, the order of execution of the blocks may be changed, and/or some of the blocks described may be changed, eliminated, or combined.

As mentioned above, the example processes of FIGS. 4-9B may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 4-9B may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 4:
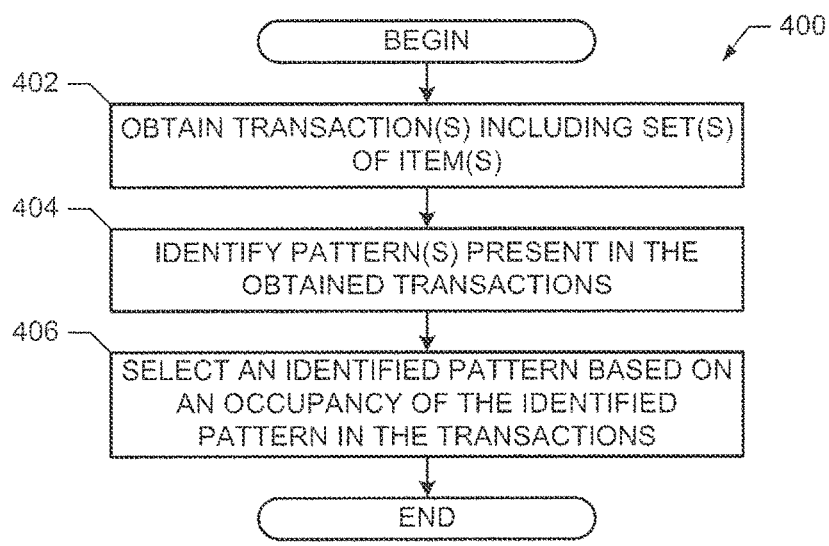
FIG. 4 is a flowchart representative of example machine readable instructions which may be executed to implement a data miner to perform pattern mining.

FIG. 4 is a flowchart representative of example machine readable instructions 400 which may be executed to implement a data miner (e.g., the data miner 102 of FIGS. 1 and/or 2) to perform pattern mining. The example instructions 400 may be performed by the example processor platform 1000 of FIG. 10.

The example instructions 400 begin by obtaining transactions that include set(s) of item(s) (block 402). For example, the itemset miner 204 of FIG. 2 may obtain transactions from a transaction database (e.g., the transaction database 106 of FIG. 1). Each of the obtained transactions includes one or more items.

The example itemset pruner 206 of FIG. 2 identifies pattern(s) present in the obtained transactions (block 404). For example, the itemset pruner 206 prunes a subset tree to obtain a search space. Pattern(s) remaining after pruning may be used as the identified pattern(s).

The example itemset recommender 214 of FIG. 2 selects an identified pattern based on an occupancy of the identified pattern in the transaction(s) (block 406). In some examples, the itemset recommender 214 selects the identified pattern based on quality (which is based on occupancy). In some examples, the itemset recommender 214 selects multiple identified patterns (e.g., when top-k patterns are requested). The example instructions 400 of FIG. 4 end after selecting an identified pattern.

Figure 5:
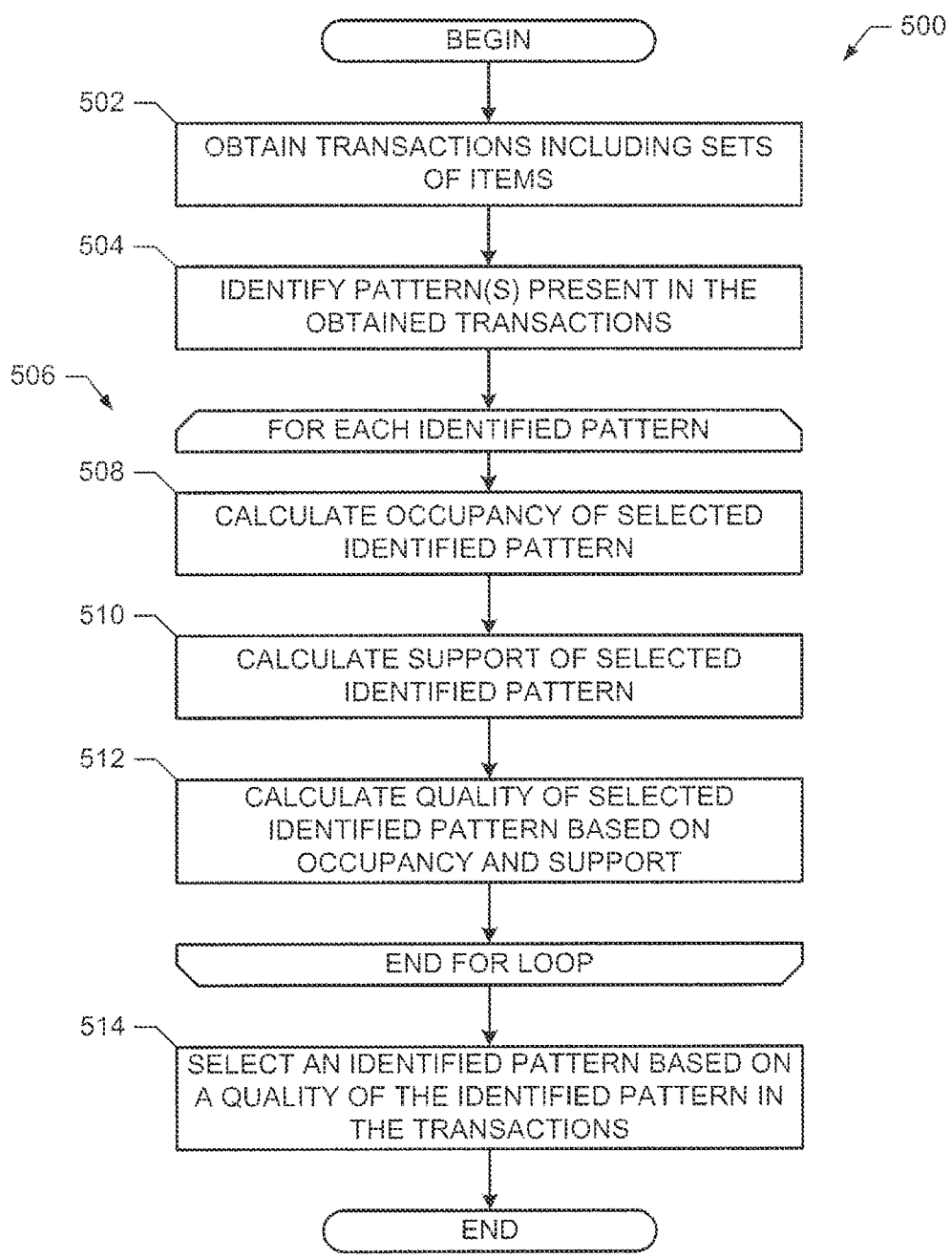
FIG. 5 is a flowchart representative of example machine readable instructions which may be executed to implement a data miner to perform pattern mining.

FIG. 5 is a flowchart representative of alternative example machine readable instructions 500 which may be executed to implement a data miner (e.g. the data miner 102 of FIGS. 1 and/or 2) to perform pattern mining. The example instructions 500 may be performed by the example processor platform 1000 of FIG. 10.

The instructions 500 of FIG. 5 begin by obtaining (e.g., via the itemset miner 204 of FIG. 2) transaction(s) including set(s) of item(s) (block 502). The example itemset pruner 206 identifies pattern(s) present in the obtained transaction(s) (block 504). The example blocks 502 and 504 may be executed in an identical, similar, and/or different manner than blocks 402 and 404 of FIG. 4.

The example instructions 500 of FIG. 5 enter a for-loop 506 for each of the identified patterns (block 504). In some examples, the for-loop 506 may be performed for less than all of the identified patterns 504 based on pruning of a subset tree (e.g., removal of identified patterns) by the itemset pruner 206. For each identified pattern (loop 506), the example instructions include blocks 508-512.

The example occupancy calculator 210 of FIG. 2 determines (e.g., calculates, estimates) an occupancy of an identified pattern (e.g., the identified pattern under consideration for that iteration of the loop 506) (block 508). Likewise, the example support calculator 208 determines (e.g., calculates, estimates) a support of the selected identified pattern (block 510). Based on the occupancy (block 508) and the support (block 510), the example quality calculator 212 of FIG. 2 determines (e.g., calculates, estimates) a quality of the selected identified pattern (block 512). In some examples, the quality is further based on a weight of the occupancy (e.g., the weight $\lambda$).

When the loop 506 has completed (e.g., each of the identified patterns has been processed and/or pruned), the example itemset recommender 214 of FIG. 2 selects an identified pattern based on the quality of the identified pattern (block 514). In some examples, the itemset recommender 214 selects multiple identified patterns (e.g., when top-k patterns are requested). The example instructions 500 of FIG. 5 end after selecting an identified pattern.

Figure 6:
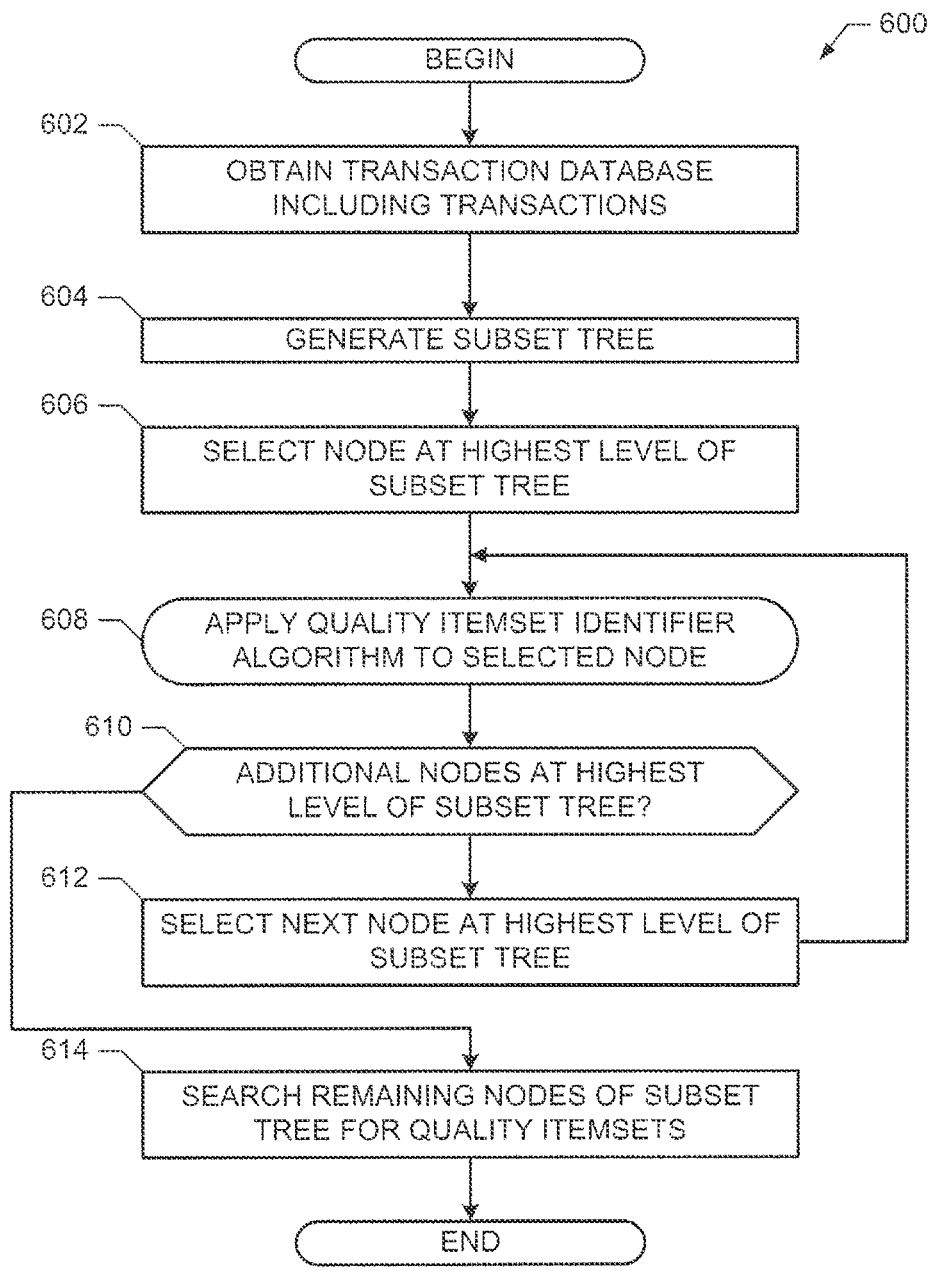
FIG. 6 is a flowchart representative of example machine readable instructions which may be executed to implement a data miner to provide quality patterns.

FIG. 6 is a flowchart representative of example machine readable instructions 600 which may be executed to implement a data miner (e.g., the data miner 102 of FIGS. 1 and 2) to provide quality patterns. The example instructions 600 may be performed by the example processor platform 1000 of FIG. 10.

The example instructions 600 of FIG. 6 begin by obtaining a transaction database (e.g., the transaction database 106) including transactions (block 602). In the example of FIG. 6, each of the transactions include a set of items. The sets of items in any two of the transactions in the transaction database 106 may be similar, identical, overlapping, or completely different.

The example itemset miner 204 of FIG. 2 generates a subset tree (e.g., the subset tree 300 of FIG. 3) (block 604). The generated subset tree 300 may include a hierarchical organization of potential and/or existing patterns in the transactions.

The example itemset pruner 206 of FIG. 2 selects a node (e.g., a pattern) at the highest level of the subset tree (block 606). For instance, the itemset pruner 206 may select any of the example nodes 308-314 at the first level 338 of FIG. 3 and/or may select the root node 350 of FIG. 3. The example itemset pruner 206 applies a quality itemset identifier algorithm (e.g., set of instructions) to the selected node (block 608). The example quality itemset identifier algorithm determines whether a quality itemset may be present in the subtree having the selected node as the subtree root. Because, as explained below, the quality itemset identifier algorithm is recursive, applying the quality itemset identifier algorithm to the root node of a subtree results in the analysis of the nodes in the subtree. For example, the itemset pruner 206 applies the quality itemset identifier algorithm to the node 308 to analyze the nodes 308 and 316-328. The example quality itemset identifier algorithm is described in more detail below with reference to FIGS. 7A-9B.

After applying the quality itemset identifier algorithm (block 608), the example itemset pruner 206 of FIG. 2 determines whether there are additional nodes at the highest level of the subset tree 300 to be processed (e.g., have the quality itemset identifier algorithm applied) (block 610). If there are additional nodes (block 610), the example itemset pruner 206 selects the next (unanalyzed) node at the highest level 338 of the subset tree 300 and returns control to block 608 to apply the quality itemset identifier algorithm.

The itemset pruner 206 may remove one or more subtrees of nodes from the example subset tree 300 by applying the quality itemset identifier algorithm. When there are no additional nodes to be processed (block 610), the example itemset recommender 214 searches the remaining nodes (those nodes that have not been pruned by the itemset pruner 206) for quality itemsets (block 614). For example, the itemset recommender 214 may search the remaining nodes for any qualified itemsets and/or may search the remaining nodes for the top-k quality itemsets. The example instructions 600 of FIG. 6 end after searching for (and/or selecting) quality itemsets.

Figure 7A:
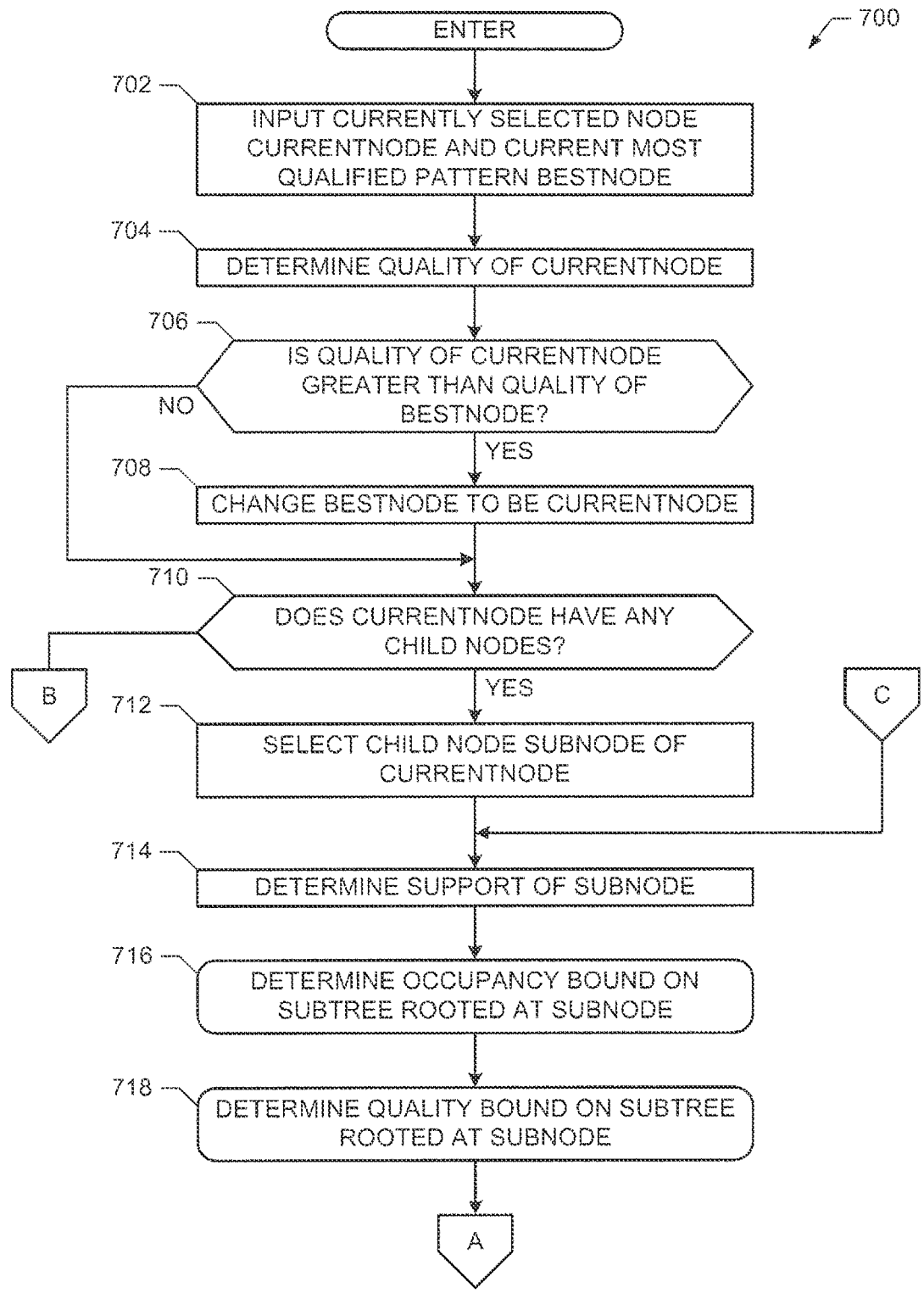
FIGS. 7A and 7B are a flowchart representative of example machine readable instructions which may be executed to implement an itemset pruner to prune a subset tree.
Figure 7B:
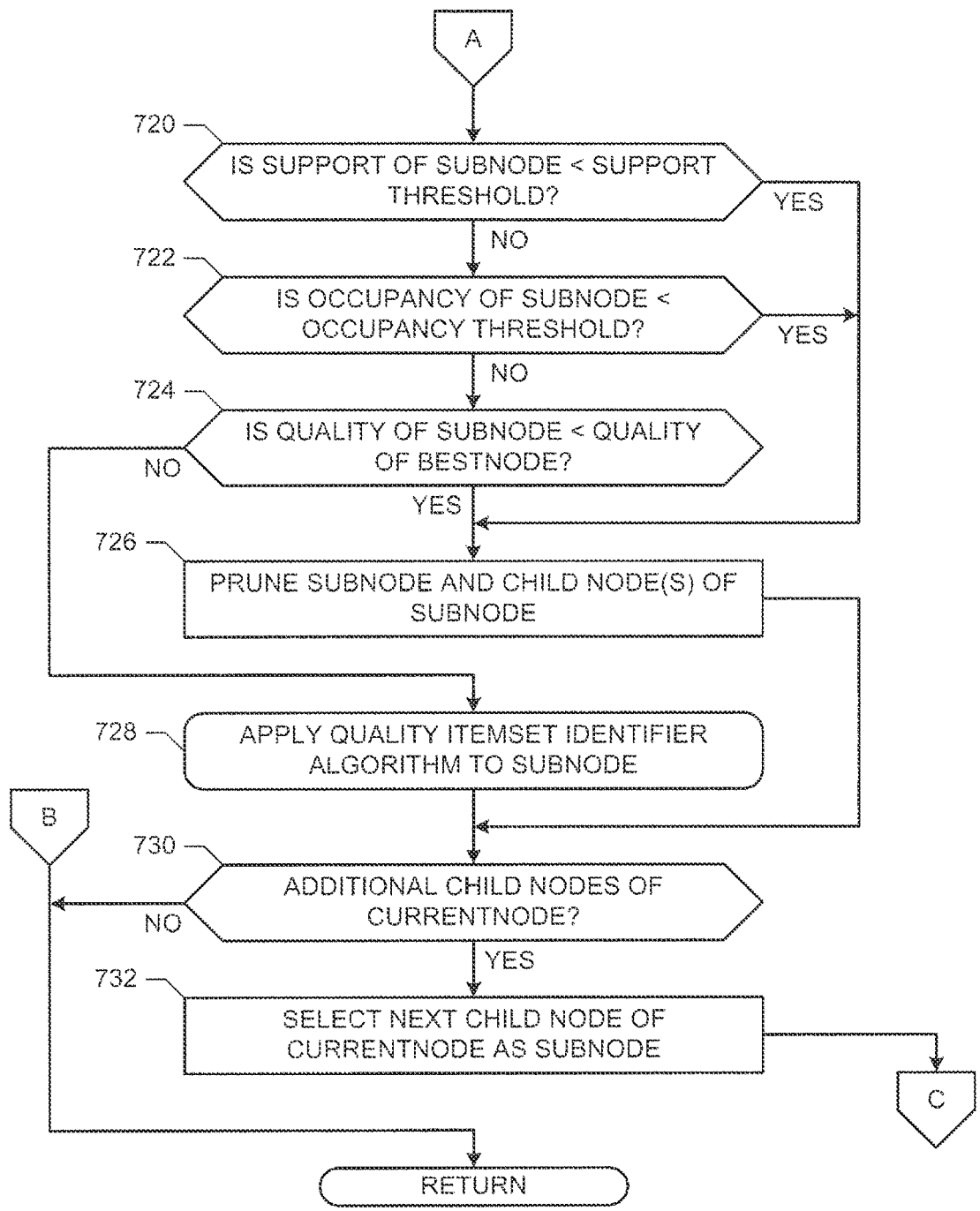

FIGS. 7A and 7B are a flowchart representative of example machine readable instructions 700 which may be executed to implement an itemset pruner (e.g., the itemset pruner 206 of FIG. 2) to prune a subset tree. The example instructions 700 may be performed by the example processor platform 1000 of FIG. 10 to implement the example block 608 of FIG. 6 (e.g., to apply the quality itemset identifier algorithm to a node).

The example instructions 700 enter from block 606 and/or block 612 of FIG. 6, and receive as inputs a currently selected node (from block 606 or block 612) "CurrentNode" and a current most qualified pattern "BestNode" (block 702). BestNode may be stored in a memory from previous executions of the example instructions 700 on a previously-selected node.

The example quality calculator 212 of FIG. 2 determines a quality of CurrentNode (block 704). For example, the quality calculator 212 of FIG. 2 determines the quality of CurrentNode based on a support of CurrentNode determined by the support calculator 208 and the occupancy of CurrentNode determined by the occupancy calculator 210.

The example itemset pruner 206 determines whether the quality of CurrentNode is greater than a quality of BestNode (block 706). For example, the quality of BestNode may be stored in a memory in association with the identification of BestNode. If the quality of CurrentNode is greater than the quality of BestNode (block 706), the example itemset pruner 206 changes BestNode to be CurrentNode (block 708). For example, the itemset pruner 206 may change an identification of BestNode to be the identification of CurrentNode, and the quality of BestNode to be the quality of CurrentNode.

After changing BestNode (block 708), or if the quality of CurrentNode is not greater than the quality of BestNode (block 706), the example itemset pruner 206 determines whether CurrentNode has any child nodes (block 710). If CurrentNode has at least one child node (block 710), the example itemset pruner 206 selects a first child node SubNode of CurrentNode (block 712).

The example support calculator 208 determines a support of SubNode (block 714). The occupancy calculator 210 determines an occupancy bound on the subtree rooted at SubNode (block 716). The example quality calculator 212 determines a quality bound on the subtree rooted at SubNode (block 718). The quality bound is based on the occupancy bound (block 716). Example instructions for determining the quality bound are described below with reference to FIGS. 8A-9B.

Moving to FIG. 7B, the example instructions 700 continue by determining (e.g., via the itemset pruner 206) whether the support of SubNode is less than a support threshold (e.g., α) (block 720). If the support is not less than the support threshold α (block 720), the example itemset pruner 206 determines whether the occupancy of SubNode is less than an occupancy threshold (e.g. β) (block 722). If the occupancy is not less than the occupancy threshold β (block 722), the example itemset pruner 206 determines whether the quality of SubNode is less than a quality of BestNode (block 724).

If the support of SubNode is less than the support threshold α (block 720), if the occupancy of SubNode is less than the occupancy threshold β (block 722), and/or if the quality of SubNode is less than the quality of BestNode (block 724), the example itemset pruner 206 prunes SubNode and any child node(s) of SubNode (block 726). The pruning is performed to increase efficiency, because SubNode and any child nodes of SubNodes will not be qualified under the thresholds α and β provided to the itemset pruner 206.

On the other hand, if the support of SubNode is not less than the support threshold α (block 720), if the occupancy of SubNode is not less than the occupancy threshold β (block 722), and if the quality of SubNode is not less than the quality of BestNode (block 724), the example itemset pruner 206 applies the quality itemset identifier algorithm to the SubNode (block 728). For example, the itemset pruner 206 may initiate a subroutine including the instructions 700 of FIGS. 7A and 7B, where SubNode is used as the currently selected node CurrentNode, and BestNode is used as the most qualified pattern BestNode. In this manner, the example instructions 700 may be recursive to process as many as all of the nodes 308-336 in the subset tree 300.

After returning from applying the quality itemset identifier algorithm to SubNode (and any lower subnodes) (block 728), or after pruning SubNode and any child nodes of SubNode (block 726), the example itemset pruner 206 determines whether there are any additional child nodes of CurrentNode (block 730). If there are additional child nodes of CurrentNode (block 730), the example itemset pruner 206 selects the next child node of CurrentNode as SubNode (block 732) and control returns to block 714 to determine the support of SubNode. If there are no additional child nodes of CurrentNode (block 730), or if CurrentNode has no child nodes (block 710), the example instructions 700 end and return control to the calling function. The calling function may be, for example, block 728 of FIG. 7 that is applying the quality itemset identifier algorithm to the parent node of CurrentNode and/or block 608 of FIG. 6 that is applying the quality itemset identifier algorithm to a selected node.

Figure 8:
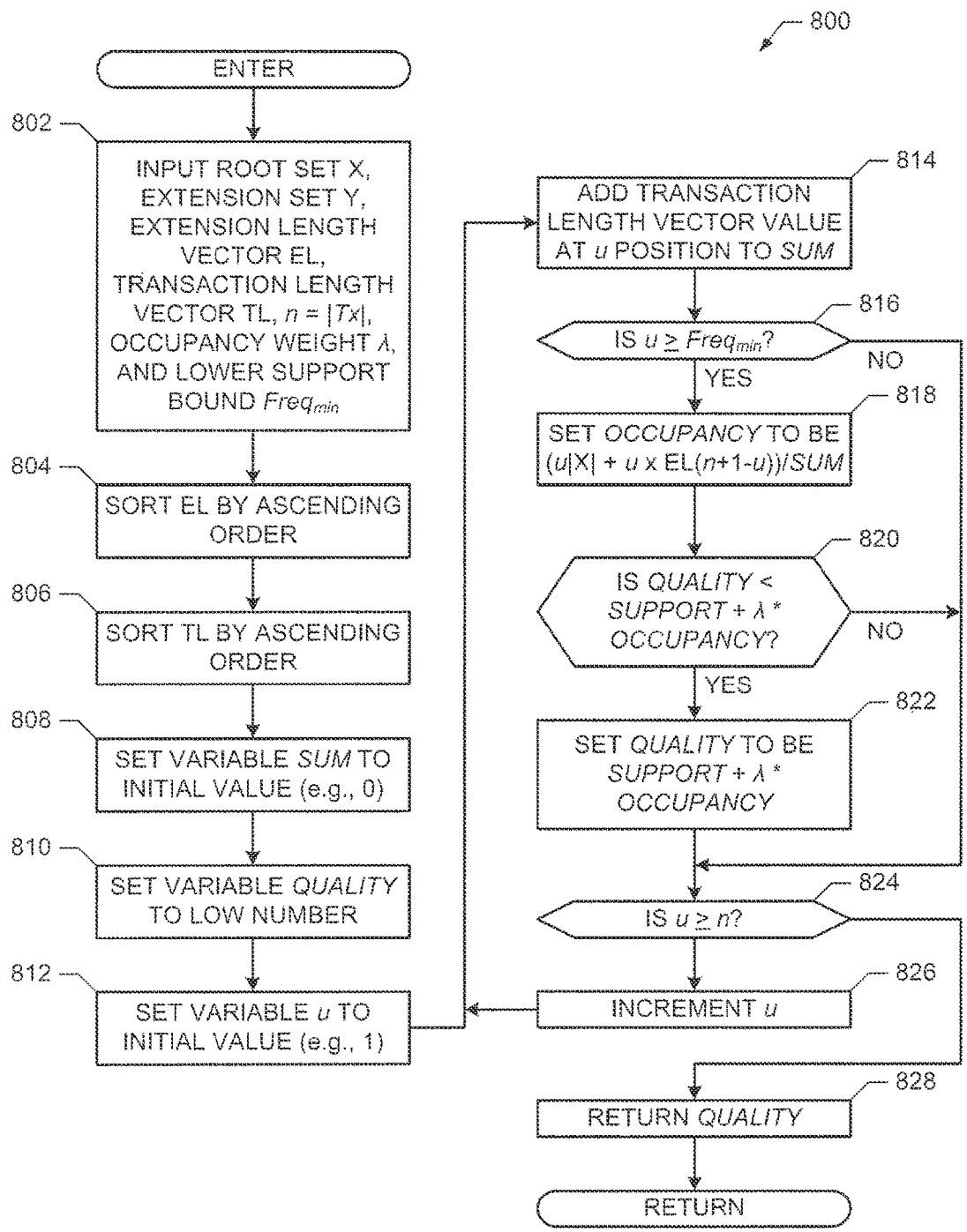
FIG. 8 is a flowchart representative of example machine readable instructions which may be executed to implement a quality calculator to estimate a quality bound.

FIG. 8 is a flowchart representative of example machine readable instructions 800 which may be executed to implement a quality calculator (e.g., the quality calculator 212 of FIG. 2) to estimate a quality bound. The example instructions 800 may be executed may be performed by the example processor platform 1000 of FIG. 10 to implement the example block 718 of FIG. 7 (e.g., to determine a quality bound on a subtree rooted at a node).

The following notations are used to describe the examples of FIGS. 8 and 9. For any subtree, X is the itemset for the subtree root (i.e., the root itemset). Y is the itemset including all the items which will be extended in all the descendants of this subtree (i.e., the extension itemset). For example, for the subtree root X={b}(e.g., node 310 of FIG. 3), there are two items, c and d, which appear in the child nodes 330-334. Thus, Y={cd}. The vector EL is the Extension Length vector, and is equal to $EL(i)=|t_i \cap Y|$. TL is the Transaction Length vector and is equal $TL(i)=|t_i|$, where $t_i$ is any transaction in Tx. For example, for the root set X={ab} with extension set Y={cd}, the supporting transactions in the example transaction database 302 of FIG. 3 are Tx=<t2, t3, t4, t5>, and thus $EL=<|t2 \cap Y|, |t3 \cap Y|, |t4 \cap Y|, |t5 \cap Y|>=<0, 1, 1, 2>$. Further, $TL=<|t2|, |t3|, |t4|, |t5|>=<2, 3, 3, 4>$. The variable u denotes the frequency of an itemset W in the subtree rooted at X. The variable v denotes how many items are in W other than the items in X, i.e. v=|W−X|. These notations are summarized in Table 2.

Additionally, the vectors EL and TL may be sorted in ascending and/or descending order. For a vector V (e.g., EL or TL), $V^{\uparrow}(V^{\downarrow})$ is the vector obtained by sorting V in ascending (descending) order. Thus, $EL^{\downarrow}(1)$ will be the largest value in EL, and $TL^{\uparrow}(i)$ will be the i-th smallest value in TL.

TABLE 3

Figure 9A:
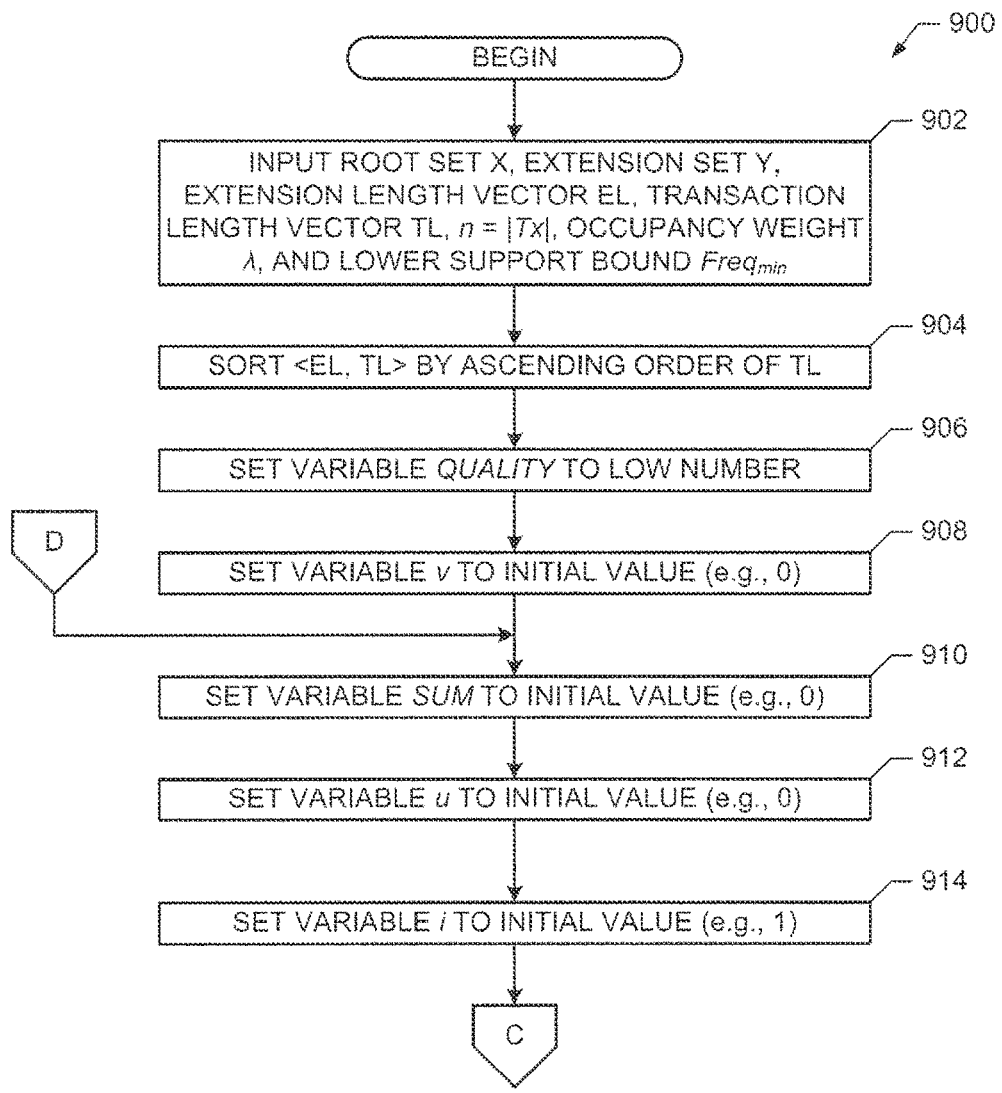
FIGS. 9A and 9B are flowcharts representative of example machine readable instructions which may be executed to implement a quality calculator to estimate a quality bound.
Figure 9B:
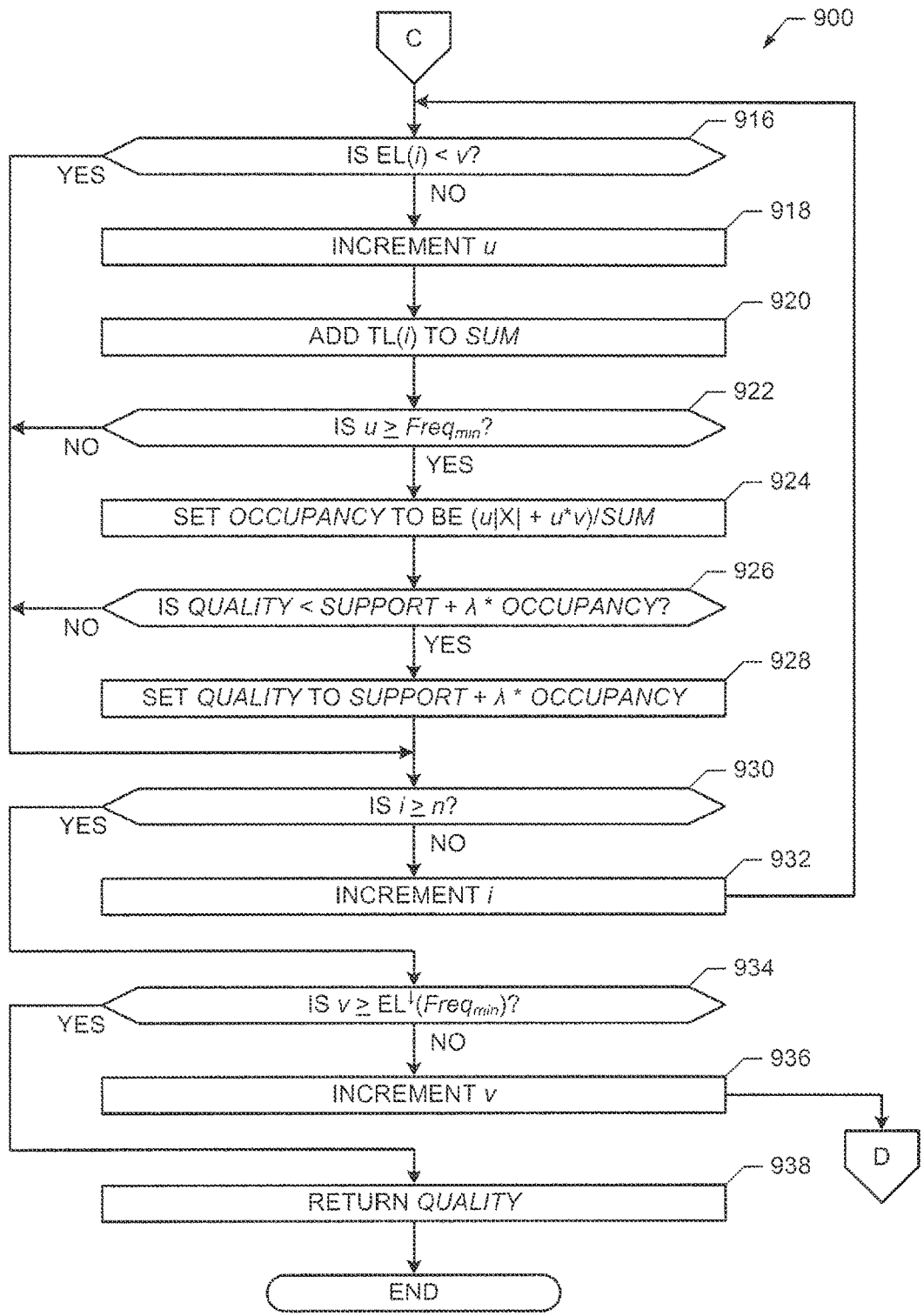

Notations used for FIGS. 8 and 9A-9B

| | |
|---|---|
| X | The itemset for the root of a subtree |
| Y | The extension itemset for the corresponding subtree |
| W | Any itemset in the subtree X, $X \subseteq W \subseteq (X \cup Y)$ |
| u | |Tw| |
| v | |W − X| |
| EL | The Extension Length vector, $EL(i) = |t_i \cap Y|$ where $t_i \in Tx$ |
| TL | The Transaction Length vector, $TL(i) = |t_i|$ where $t_i \in Tx$ |
| $V^{\uparrow}, V^{\downarrow}$ | Vector V sorted by ascending/descending order |

The example instructions 800 receive as inputs an input root set X, an extension set Y, an extension length vector EL, a transaction length vector TL, a number n of transactions supporting X (n=|Tx|), an occupancy weight λ, and a lower support boundary $Freq_{min}$ (block 802). The example quality calculator 212 sorts EL by ascending order (e.g., $EL^{\uparrow}$) (block 804). The example quality calculator 212 also sorts TL by ascending order (e.g., $TL^{\uparrow}$) (block 806).

The example quality calculator 212 sets a variable SUM to an initial value (e.g., 0) (block 808). The example quality calculator 212 also sets a variable QUALITY to a low number (e.g., a lowest number computationally possible) (block 810). As illustrated below, initially setting QUALITY to a low number allows the value of QUALITY to be modified at the first opportunity. The example quality calculator sets the variable u (e.g., the number of items in a subtree of root set X) to an initial value (e.g., 1) (block 812).

The quality calculator 212 adds the value of the transaction length vector at position u (e.g., $TL^{\uparrow}(u)$) to the value of SUM and stores the result in SUM (block 814). The example quality calculator 212 determines whether u is equal to or greater than the lower frequency bound $Freq_{min}$ (block 816). If u is at least the lower frequency bound $Freq_{min}$ (block 816), the example quality calculator 212 sets OCCUPANCY to be (u|X|+u×EL(n+1−u))/SUM (block 818). The example quality calculator 212 determines whether QUALITY is less than the sum of SUPPORT (e.g., u/|T|) and the weight λ times the occupancy (e.g., λ×OCCUPANCY) (block 820). If QUALITY is less than the sum of SUPPORT and the weight λ times OCCUPANCY (block 820), the example quality calculator 212 sets QUALITY to be the sum of SUPPORT and the weight λ times OCCUPANCY (block 822).

If u is not greater than or equal to the threshold support value $Freq_{min}$ (block 816), the example quality calculator 212 does not perform blocks 818-822 and transfers to block 824 to determine whether u is greater than or equal to n (the number of transactions supporting X). Likewise, if the quality calculator 212 determines that QUALITY is not less than the sum of SUPPORT and the weight λ times OCCUPANCY (block 820), the example quality calculator 212 does not perform block 822 (e.g., maintains the value of QUALITY) and transfers to block 824.

If the value of u is less than n (block 824), the example quality calculator 212 increments u and returns control to block 814. If the value of u is greater than or equal to n (block 824), the example quality calculator 212 returns the value of QUALITY (e.g., to the itemset pruner 206) and the example instructions 800 return control to a calling function (e.g., block 718 of FIG. 7A).

In other words, the example quality calculator 212 incrementally considers the transactions supporting X to determine the upper quality bound. When there are under consideration at least a threshold number of transactions supporting the root set X, the example quality calculator 212 calculates the average occupancy of the root set X in the transactions and calculates a quality based on the weight, the occupancy, and the support. The quality calculator 212 maintains and updates the highest quality value to be returned as the upper quality bound.

The example occupancy calculator 210 of FIG. 2 may determine an upper occupancy bound in a similar manner as shown in FIG. 8. In particular, the occupancy calculator 210 may calculate the occupancy via blocks 802-818 and maintain an upper occupancy value. For example, if the occupancy calculated at block 818 is compared to a highest observed occupancy value (omitting blocks 820 and 822), the occupancy calculator 210 may determine and return an upper occupancy bound.

FIGS. 9A and 9B are a flowchart representative of alternative example machine readable instructions 900 which may be executed to implement a quality calculator (e.g., the quality calculator 212 of FIG. 2) to more precisely estimate a quality bound. The example instructions 900 may be executed may be performed by the example processor platform 1000 of FIG. 10 to implement the example block 718 of FIG. 7 (e.g., to determine a quality bound on a subtree rooted at a node). In contrast with the example instructions 800 of FIG. 8, the example instructions 900 are more likely to result in a more precise upper bound than the instructions 800. However, the example instructions 800 of FIG. 8 are more likely to be more efficient than the example instructions 900.

The example instructions 900 of FIG. 9 receive as inputs an input root set X, an extension set Y, an extension length vector EL, a transaction length vector TL, a number n of transactions supporting X (n=|Tx|), an occupancy weight $\lambda$, and a lower support boundary $Freq_{min}$ (block 802). The example quality calculator 212 sorts the vector <EL, TL> by ascending order of TL (e.g., $TL^\uparrow$) (block 904).

The example quality calculator 212 also sets a variable QUALITY to a low number (e.g., a lowest number computationally possible) (block 906). As illustrated below, initially setting QUALITY to a low number allows the value of QUALITY to be modified at the first opportunity. The example quality calculator 212 sets the variable v (e.g., the number of items in the superset W not included in the root set X) to an initial value (e.g., 1) (block 908). The example quality calculator 212 sets a variable SUM to an initial value (e.g., 0) (block 910). The example quality calculator 212 sets the variable u (e.g., the number of items in a subtree of root set X) to an initial value (e.g., 1) (block 912). The example quality calculator 212 sets the variable i (e.g., an index value) to an initial value (e.g., 1) (block 914).

Moving to FIG. 9B, the example quality calculator 212 determines whether the i-th value of EL (e.g., EL(i), as sorted by $TL^\uparrow$) is less than v (block 916). If EL(i) is not less than v (block 916), the example quality calculator 212 increments u (block 918). The example quality calculator 212 adds the i-th smallest value of TL (e.g. $TL^\uparrow(i)$) to the value of SUM (block 920).

The example quality calculator 212 determines whether the value of u is equal to or greater than the lower frequency bound $Freq_{min}$ (block 922). If the value of u is at least the lower frequency bound $Freq_{min}$ (block 922), the example quality calculator 212 sets the value of OCCUPANCY to be equal to (u|X|+u*v)/SUM (block 924). The example quality calculator 212 determines whether QUALITY is less than the sum of SUPPORT (e.g. u/|T|) and the weight $\lambda$ times the occupancy (e.g., $\lambda \times$OCCUPANCY) (block 926). If QUALITY is less than the sum of SUPPORT and the weight $\lambda$ times OCCUPANCY (block 926), the example quality calculator 212 sets QUALITY to be the sum of SUPPORT and the weight $\lambda$ times OCCUPANCY (block 928).

If the i-th value of EL (e.g., EL(i), as sorted by $TL^\uparrow$) is less than v (block 916), the example quality calculator 212 skips blocks 918-928) and transfers control to block 930 to determine whether the value of i is greater than or equal to the value of n (the number of transactions supporting X). If u is not greater than or equal to the threshold support value $Freq_{min}$ (block 922), the example quality calculator 212 does not perform blocks 924-928 and transfers to block 930. If the quality calculator 212 determines that QUALITY is not less than the sum of SUPPORT and the weight $\lambda$ times OCCUPANCY (block 926), the example quality calculator 212 does not perform block 928 (e.g., maintains the value of QUALITY) and transfers to block 930.

If the value of i is not greater than or equal to the value of n (block 930), the example quality calculator 212 increments the value of i and returns control to block 916. If the value of i is greater than or equal to n (block 930), the example quality calculator 212 determines whether the value of v is greater than or equal to $EL_\downarrow(Freq_{min})$ (block 934). If the value of v is not greater than or equal to $EL_\downarrow(Freq_{min})$ (block 934), the example quality calculator 212 increments v (block 936) and returns to block 912 (FIG. 9A) to set (e.g., reset) SUM to its initial value (e.g., 0).

If the value of v is greater than or equal to $EL_\downarrow(Freq_{min})$ (block 934), the example quality calculator 212, the example quality calculator 212 returns the value of QUALITY as the quality upper bound (block 938). The example instructions 900 end and control returns to a calling function (e.g., to block 720 of the example instruction 700 of FIGS. 7A and 7B).

The example occupancy calculator 210 of FIG. 2 may determine an upper occupancy bound in a similar manner as shown in FIGS. 9A and 9B. In particular, the occupancy calculator 210 may calculate the occupancy via blocks 902-924 and maintain an upper occupancy value. For example, if the occupancy calculated at block 924 is compared to a highest observed occupancy value (omitting blocks 926 and 928), the occupancy calculator 210 may determine and return an upper occupancy bound.

While the example instructions 900 have a higher complexity than the instructions 800 of FIG. 8, the instructions 900 also provide a more precise estimation of quality. However, the example instructions 800 and 900 may be modified to achieve a balance between bound precision and computational efficiency. Instead of enumerating every possible value of EL in the range of $[0, EL_\downarrow(Freq_{min})]$, the range may be divided into m smaller intervals $[v_0, v_1-1], \ldots, [v_{m-1}, v_m-1]$ where $v_0=0$ and $v_m=EL_\downarrow(Freq_{min})+1$.

For each interval $[v_{k-1}, v_k-1]$, using the assumption that $v_{k-1} \leq |W-X| < v_k$, there is a tighter bound on occupancy. After performing the example instructions 800 and/or 900 for each of the intervals, the m bounds are aggregated to get a quality bound. An advantageous tradeoff between computational efficiency and bound precision may be achieved using an appropriate value for m.

Either of the example sets of instructions 800 and/or 900 of FIGS. 8 and/or 9A-9B may be modified to utilize the arithmetic occupancy and/or arithmetic average rather than the harmonic occupancy and the harmonic average. For example, blocks 818 and/or 924 of FIGS. 8 and/or 9B may be modified to calculate OCCUPANCY using the arithmetic occupancy.

Additionally, while QUALITY is calculated using the weighted sum of SUPPORT and OCCUPANCY in the foregoing examples, QUALITY may be calculated using other formulations and/or combinations of SUPPORT and OCCUPANCY.

The example instructions 800 and/or 900 of FIGS. 8 and/or 9A-9B may be modified to change the ordering of the EL and/or VL vectors. For example, by ordering the vectors such that the quality is determined in the order of ascending support of the itemsets, the quality calculator 212 outputs quality bounds that are closer to the actual qualities of the nodes than when the qualities are determined in the order of descending support. However, by ordering by descending support, nodes are pruned more quickly and, thus, higher computational efficiency is achieved.

Figure 10:
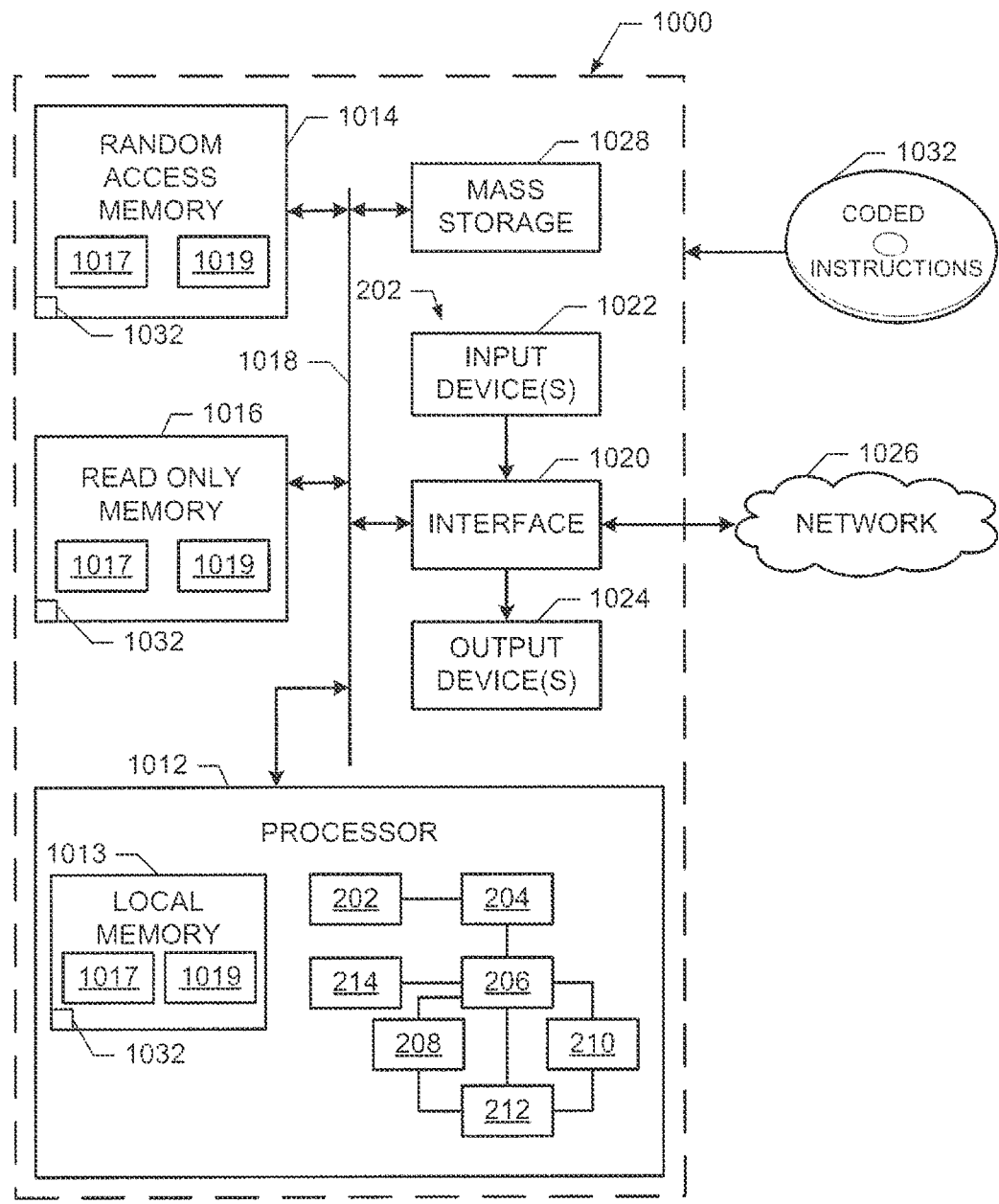
FIG. 10 is a block diagram of an example processor platform capable of executing the instructions of FIGS. 4-9B to implement the data miner of FIGS. 1 and/or 2.

FIG. 10 is a block diagram of an example processor platform 1000 capable of executing the instructions 400, 500, 600, 700, 800, and/or 900 of FIGS. 4-9B to implement the data miner 102 of FIGS. 1 and 2. The processor platform 1000 can be, for example, a server, a personal computer, or any other type of computing device.

The processor platform 1000 of the instant example includes a processor 1012. For example, the processor 1012 can be implemented by one or more microprocessors, controllers, and/or logic circuits from any desired family or manufacturer. The example processor 1012 of FIG. 10 implements the data miner 102 of FIG. 2, including the example request receiver 202, the example itemset miner 204, the example itemset pruner 206, the example support calculator 208, the example occupancy calculator 210, the example quality calculator 212, and/or the example itemset recommender 214.

The processor 1012 includes a local memory 1013 (e.g., a cache) and is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller. Any of the example local memory 1013, the example volatile memory 1014, and/or the example non-volatile memory 1016 may store instructions and/or data representative of variables 1017 and/or data 1019 used (e.g., stored and/or retrieved) by the example data miner 102. Such variables and/or data may include any or all of X, Y, W, u, v, EL, TL, SUPPORT, QUALITY, OCCUPANCY, T, Tx, n, $\alpha$, $\beta$, $\lambda$, and/or any other variables and/or data. The example request receiver 202, the example itemset miner 204, the example itemset pruner 206, the example support calculator 208, the example occupancy calculator 210, the example quality calculator 212, and/or the example itemset recommender 214 and/or, more generally, the example processor 1012 access the data and/or variables from any of the local memory 1013, the volatile memory 1014, and/or the non-volatile memory 1016

The processor platform 1000 also includes an interface circuit 1020. The interface circuit 1020 may be implemented by any type of interface standard, such as an Ethernet interface, a universal serial bus (USB), and/or a PCI express interface.

One or more input devices 1022 are connected to the interface circuit 1020. The input device(s) 1022 permit a user to enter data and commands into the processor 1012. The input device(s) can be implemented by, for example, a keyboard, a mouse, a touchscreen, a track-pad, a trackball, isopoint and/or a voice recognition system.

One or more output devices 1024 are also connected to the interface circuit 1020. The output devices 1024 can be implemented, for example, by display devices (e.g., a liquid crystal display, a cathode ray tube display (CRT), a printer and/or speakers). The interface circuit 1020, thus, typically includes a graphics driver card. The example interface circuit 1020, the example input device(s) 1022, and/or the example output device(s) 1024 may be used in combination to implement the user interfaces 202 of FIGS. 2 and/or 3.

The interface circuit 1020 also includes a communication device such as a modem or network interface card to facilitate exchange of data with external computers via a network 1026 (e.g., an Ethernet connection, a digital subscriber line (DSL), a telephone line, coaxial cable, a cellular telephone system, etc.).

The processor platform 1000 also includes one or more mass storage devices 1028 for storing software and data. Examples of such mass storage devices 1028 include floppy disk drives, hard drive disks, compact disk drives and digital versatile disk (DVD) drives.

The coded instructions 1032 of FIGS. 4-9B may be stored in the mass storage device 1028, in the volatile memory 1014, in the non-volatile memory 1016, and/or on a removable storage medium such as a CD or DVD.

Example methods, apparatus, and articles of manufacture disclosed herein use occupancy to result in significant improvement of the quality of pattern recommendations compared to known pattern mining methods. Example methods, apparatus, and articles of manufacture enable more efficient and/or more effective processing of transaction databases than known frequent pattern mining methods. Furthermore, example methods, apparatus, and articles of manufacture are highly flexible in that tradeoffs and/or balances may be achieved between effectiveness and computational efficiency, as well as between the relative weighting or contribution of frequency and occupancy to the overall quality of a itemset recommendation.

Although certain methods, apparatus, and articles of manufacture have been described herein, the scope of coverage of this disclosure is not limited thereto. To the contrary, this disclosure covers all methods, apparatus, and articles of manufacture falling within the scope of the claims.

What is claimed is:

1. A method of pattern mining, comprising:
identifying, via a logic circuit, a plurality of patterns present in a plurality of transactions, each transaction of the plurality of transactions including a respective set of items, each pattern of the plurality of patterns including at least one item;
determining, via the logic circuit, an occupancy of each pattern of the plurality of patterns by:
identifying supporting transactions associated with the each pattern among the plurality of transactions, wherein each of the supporting transactions comprises all items that are present in the each pattern,
determining a ratio of a first count of items in the each pattern to a second count of items in the identified supporting transactions associated with the each pattern, and
determining the occupancy of the each pattern based on the ratio; and
selecting, via the logic circuit, a particular pattern for a computer system to recommend from the identified plurality of patterns based on the occupancy of the particular pattern.

2. The method as defined in claim 1, wherein the occupancy of the identified pattern comprises an aggregation of the ratio for the identified supporting transactions.

3. The method as defined in claim 1, further comprising determining a quality of the each pattern based on the occupancy of the each pattern.

4. The method as defined in claim 3, wherein determining the quality of the each pattern is further based on support of the each pattern.

5. The method defined in claim 4, wherein selecting the particular pattern for the computer system to recommend from the identified plurality of patterns based on the occupancy of the particular pattern further comprises:
selecting the particular pattern for the computer system to recommend from the identified plurality of patterns based on the quality of the particular pattern.

6. The method as defined in claim 1, further comprising generating a subset tree for the plurality of transactions.

7. The method as defined in claim 6, further comprising pruning the subset tree based on at least one of a comparison of respective occupancies or a comparison of respective qualities of the plurality of transactions to a threshold.

8. The method as defined in claim 6, further comprising pruning a first subtree of the subset tree based on a comparison of an upper occupancy bound of a first branch to an upper occupancy bound of a second branch of the subset tree, the second branch being independent of the first branch.

9. The method as defined in claim 1, further comprising:
determining a quality metric of the each pattern based on a calculated support of the each pattern and a calculated occupancy of the each pattern; and
recommending the particular pattern in response to determining that the quality metric of the particular pattern is greater than respective quality metrics of other ones of the plurality of patterns.

10. The method defined in claim 1, wherein the occupancy is a harmonic or arithmetic occupancy.

11. An apparatus to pattern mine, comprising:
a transaction database to store a plurality of transactions, each transaction of the plurality of transactions including a respective set of items; and
a data miner comprising a hardware processor to:
identify a pattern present in the plurality of transactions, the identified pattern including at least one item;
determine an occupancy of the identified pattern by:
identifying supporting transactions associated with the identified pattern among the plurality of transactions, wherein each of the supporting transactions comprises all items that are present in the identified pattern,
determining a ratio of a first count of items in the identified pattern to a second count of items in the identified supporting transactions associated with the identified pattern, and
determining the occupancy of the identified pattern based on the ratio; and
select the identified pattern for a computer system to recommend based on the occupancy of the identified pattern.

12. The apparatus as defined in claim 11, wherein the data miner comprises an occupancy calculator to calculate the occupancy of the identified pattern.

13. The apparatus as defined in claim 11, wherein the data miner comprises a quality calculator to calculate a quality of the identified pattern based on the occupancy and a support for the identified pattern.

14. The apparatus as defined in claim 13, wherein the support of the identified pattern indicates a frequency of the identified pattern in the plurality of transactions.

15. A computer readable storage medium comprising machine readable instructions which, when executed, cause a machine to at least:
identify a pattern present in a plurality of transactions, each transaction of the plurality of transactions including a respective set of items, the identified pattern including at least one item;
determine an occupancy of the identified pattern by:
identifying supporting transactions associated with the identified pattern among the plurality of transactions, wherein each of the supporting transactions comprises all items that are present in the identified pattern,
determining a ratio of a first count of items in the identified pattern to a second count of items in the identified supporting transactions associated with the identified pattern, and
determining the occupancy of the identified pattern based on the ratio; and
select the identified pattern for a computer system to recommend based on the occupancy of the identified pattern.

16. The computer readable storage medium as defined in claim 15, wherein the instructions further cause the machine to output the identified pattern having a highest quality among a plurality of patterns.

17. The computer readable storage medium as defined in claim 16, wherein the quality of the identified pattern is based on the occupancy of the identified pattern, support of the identified pattern, and a weighting factor.

18. The computer readable storage medium as defined in claim 17, wherein the weighting factor indicates a relative importance of the support and the occupancy to a particular user application.

* * * * *